United States Patent
Mallary

(10) Patent No.: US 8,456,967 B1
(45) Date of Patent: Jun. 4, 2013

(54) SYSTEMS AND METHODS FOR PROVIDING A POLE PEDESTAL FOR MICROWAVE ASSISTED MAGNETIC RECORDING

(75) Inventor: Michael L. Mallary, Sterling, MA (US)

(73) Assignee: Western Digital (Fremont), LLC, Fremont, CA (US)

(*) Notice: Subject to any disclaimer, the term of this patent is extended or adjusted under 35 U.S.C. 154(b) by 49 days.

(21) Appl. No.: 13/271,555

(22) Filed: Oct. 12, 2011

(51) Int. Cl.
*G11B 11/00* (2006.01)
*G11B 5/127* (2006.01)

(52) U.S. Cl.
USPC ........... 369/13.33; 369/13.13; 360/125.3; 360/125.71; 360/324.2

(58) Field of Classification Search
USPC .......... 369/13.33, 13.32, 13.24, 13.14, 13.13, 369/112.27, 13.12; 360/59, 125.74, 125.3, 360/324.2, 125.71, 324.1, 324.12
See application file for complete search history.

(56) References Cited

U.S. PATENT DOCUMENTS

| | | | |
|---|---|---|---|
| 7,589,600 B2 | 9/2009 | Dimitrov et al. | |
| 7,616,412 B2 | 11/2009 | Zhu et al. | |
| 7,678,475 B2 | 3/2010 | Slavin et al. | |
| 7,791,829 B2 | 9/2010 | Takeo et al. | |
| 7,965,464 B2 * | 6/2011 | Batra et al. | 360/59 |
| 8,139,322 B2 * | 3/2012 | Yamada et al. | 360/125.3 |
| 8,154,825 B2 * | 4/2012 | Takashita et al. | 360/125.71 |
| 8,159,769 B2 * | 4/2012 | Batra et al. | 360/59 |
| 8,289,818 B2 * | 10/2012 | Taratorin et al. | 369/13.13 |
| 2008/0304176 A1 | 12/2008 | Takagishi et al. | |
| 2009/0059418 A1 | 3/2009 | Takeo et al. | |
| 2009/0059423 A1 | 3/2009 | Yamada et al. | |
| 2009/0080105 A1 | 3/2009 | Takashita et al. | |
| 2009/0080106 A1 | 3/2009 | Shimizu et al. | |
| 2009/0080120 A1 | 3/2009 | Funayama et al. | |
| 2009/0201614 A1 | 8/2009 | Kudo et al. | |
| 2009/0225465 A1 | 9/2009 | Iwasaki et al. | |
| 2009/0310254 A1 | 12/2009 | Oikawa et al. | |
| 2009/0316303 A1 | 12/2009 | Yamada et al. | |
| 2009/0316304 A1 | 12/2009 | Funayama et al. | |
| 2010/0007992 A1 | 1/2010 | Yamada et al. | |
| 2010/0007996 A1 | 1/2010 | Iwasaki et al. | |
| 2010/0027158 A1 | 2/2010 | Takagishi et al. | |
| 2010/0027161 A1 | 2/2010 | Takagishi et al. | |
| 2010/0033881 A1 | 2/2010 | Carey et al. | |
| 2010/0053795 A1 | 3/2010 | Kudo et al. | |
| 2010/0073806 A1 | 3/2010 | Koui et al. | |
| 2010/0079919 A1 | 4/2010 | Nagasawa et al. | |
| 2010/0110592 A1 | 5/2010 | Koui et al. | |
| 2010/0134922 A1 | 6/2010 | Yamada et al. | |

(Continued)

OTHER PUBLICATIONS

Xiaochun Zhu et al., "Bias-Field-Free Microwave Oscillator Driven by Perpendicularly Polarized Spin Current", IEEE Transactions on Magnetics, vol. 42, No. 10, Oct. 2006, pp. 2670-2672.

(Continued)

*Primary Examiner* — Ali Neyzari

(57) ABSTRACT

Systems and methods for providing a write pole pedestal for microwave assisted magnetic recording systems are provided. One such system includes a magnetic transducer for microwave assisted magnetic recording, the magnetic transducer including a pole including a leading edge and a trailing edge, a trailing shield positioned closer to the pole trailing edge than the pole leading edge, and an energy transducer positioned between the pole trailing edge and the trailing shield, where a trailing parallel side of the trapezoid is smaller than a leading parallel side of the trapezoid.

23 Claims, 4 Drawing Sheets

U.S. PATENT DOCUMENTS

| | | |
|---|---|---|
| 2010/0142088 A1 | 6/2010 | Iwasaki et al. |
| 2010/0195247 A1 | 8/2010 | Mochizuki et al. |
| 2010/0220415 A1 | 9/2010 | Yamada et al. |
| 2010/0232053 A1 | 9/2010 | Yano et al. |
| 2011/0007431 A1 | 1/2011 | Braganca et al. |
| 2011/0018647 A1 | 1/2011 | Lee et al. |
| 2011/0019305 A1 | 1/2011 | Suss et al. |
| 2011/0038080 A1 | 2/2011 | Alex et al. |
| 2011/0038081 A1 | 2/2011 | Contreras et al. |

OTHER PUBLICATIONS

Yuhui Tang, et al., "Narrow Track Confinement by AC Field Generation Layer in Microwave Assisted Magnetic Recording", IEEE Transactions on Magnetics, vol. 44, No. 11, Nov. 2008, pp. 3376-3379.

* cited by examiner

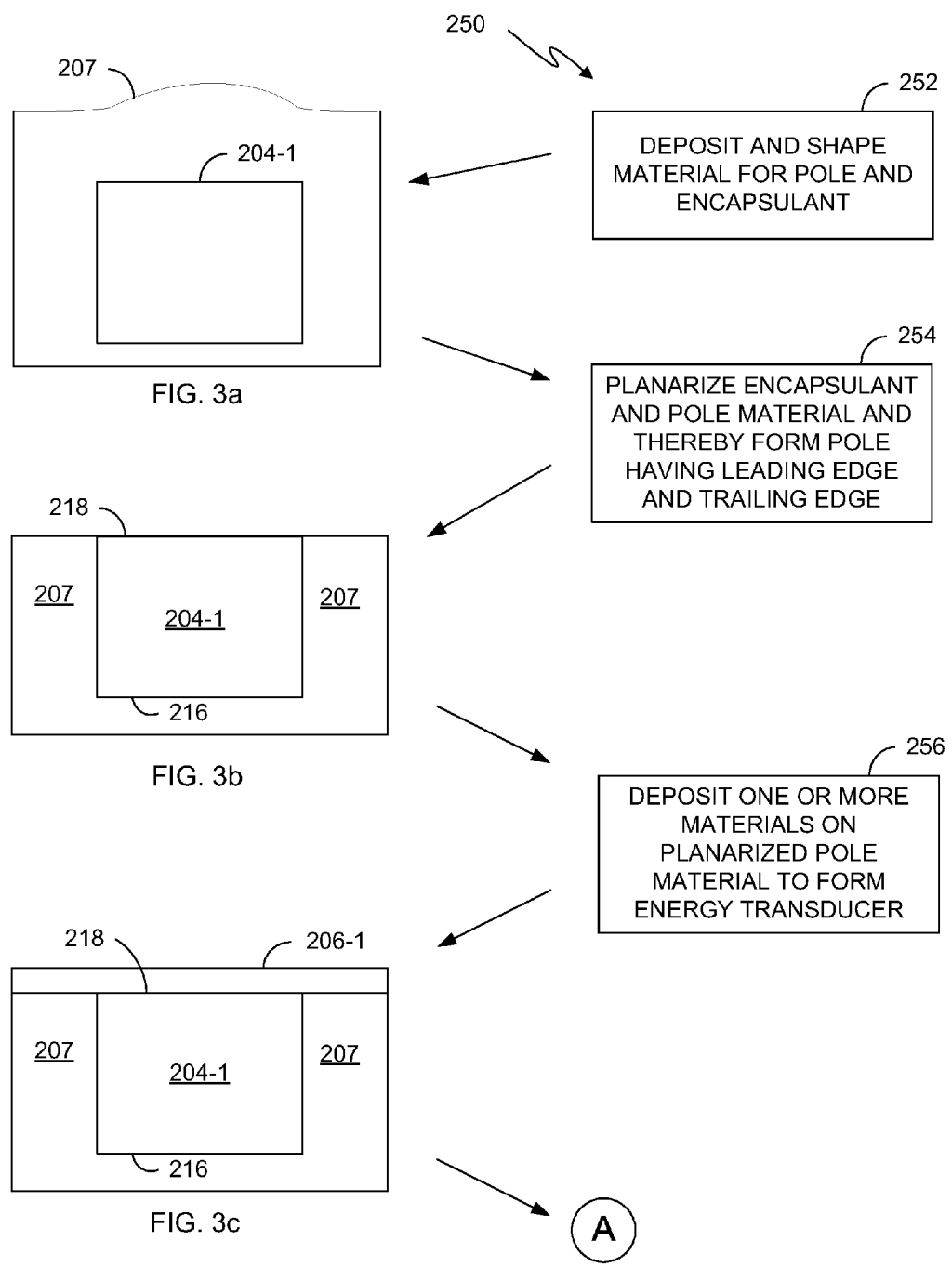

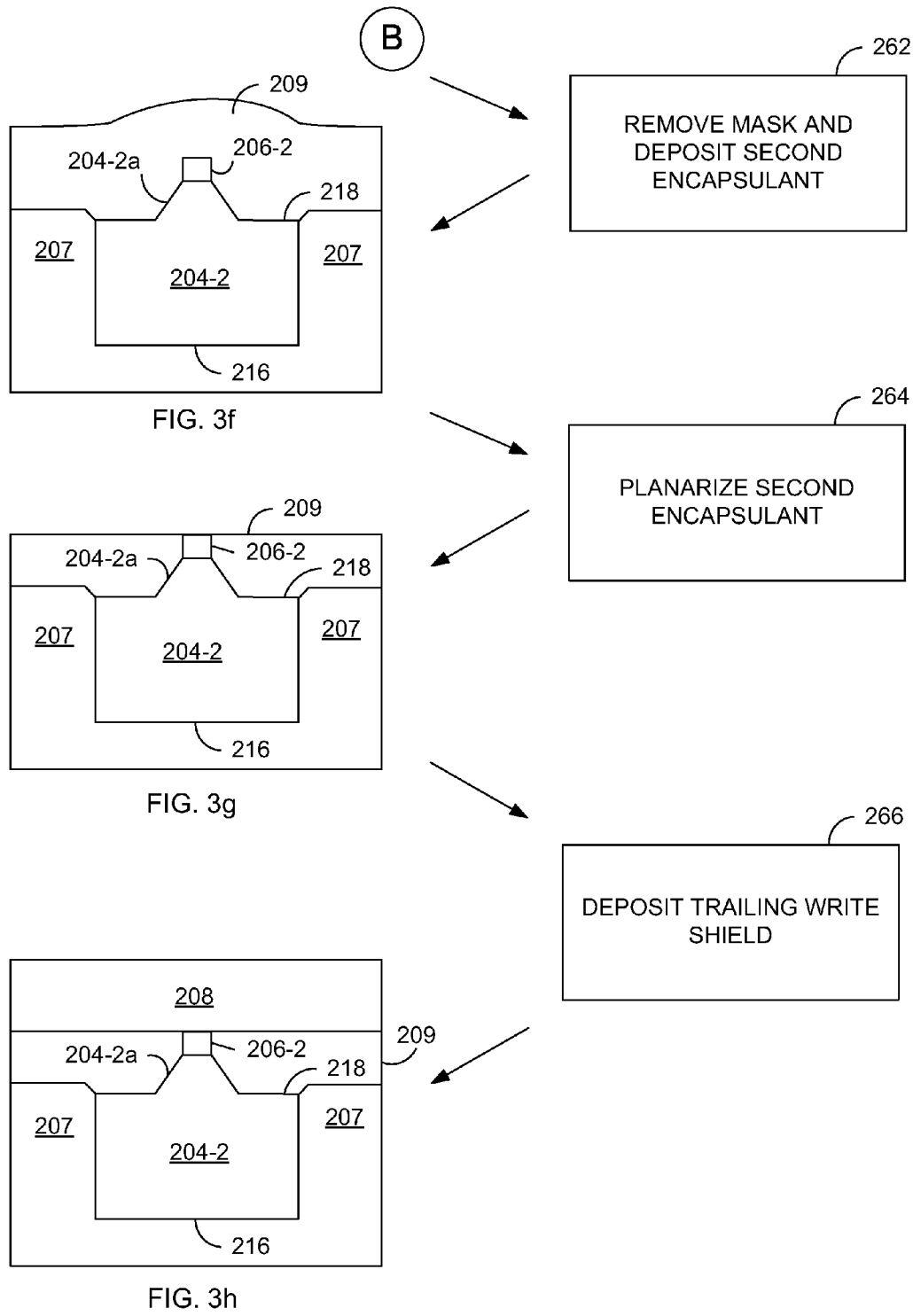

SYSTEMS AND METHODS FOR PROVIDING A POLE PEDESTAL FOR MICROWAVE ASSISTED MAGNETIC RECORDING

FIELD

The present invention relates generally to microwave assisted magnetic recording, and more specifically, to systems and methods for providing a write pole pedestal for microwave assisted magnetic recording systems.

BACKGROUND

Bit Patterned Media (BPM) and Energy Assisted Magnetic Recording (EAMR) are the primary technologies that are being investigated to overcome the Super Paramagnetic Limit (SPL) of perpendicular magnetic recording (PMR). While BPM awaits a fabrication technology that achieves performance at low cost, EAMR is struggling with media performance and head reliability. Therefore, the dark horse approach, microwave assisted magnetic recording (MAMR), is looking attractive to achieve gains of up to twice conventional levels in areal density (AD) with minimal changes in the associated heads and media.

MAMR approaches often include improved spin torque oscillators (e.g., such as those described in U.S. Pat. No. 7,616,412) that appear to show great promise for gains in areal density. However, as the component geometries are shrunk to achieve the gains in areal density, problems such as adjacent track interference (ATI) can become prevalent. As such, an improved MAMR system that reduces adjacent track interference (ATI) is needed.

SUMMARY

Aspects of the invention relate to systems and methods for providing a write pole pedestal for microwave assisted magnetic recording systems. In one embodiment, the invention relates to a magnetic transducer for microwave assisted magnetic recording, the magnetic transducer including a pole including a leading edge and a trailing edge, a trailing shield positioned closer to the pole trailing edge than the pole leading edge, and an energy transducer positioned between the pole trailing edge and the trailing shield, wherein a shape of the pole at the trailing edge comprises a trapezoid, where a trailing parallel side of the trapezoid is smaller than a leading parallel side of the trapezoid.

In another embodiment, the invention relates to a method for fabricating a magnetic transducer for microwave assisted magnetic recording, the method including depositing a ferromagnetic material for a pole, planarizing the pole material and thereby forming a pole having a leading edge and a trailing edge, depositing one or more materials on the planarized pole material to form an energy transducer, shaping the energy transducer materials such that the energy transducer includes a preselected shape, and shaping the pole materials such that the pole air bearing surface includes a trapezoidal shape at the trailing edge.

BRIEF DESCRIPTION OF THE DRAWINGS

FIGS. 3a to 3h illustrate a sequence of side views of a magnetic transducer workpiece and corresponding processing actions illustrating a process for forming the magnetic transducer including a pole pedestal in accordance with one embodiment of the invention.

DETAILED DESCRIPTION

Figure 1:
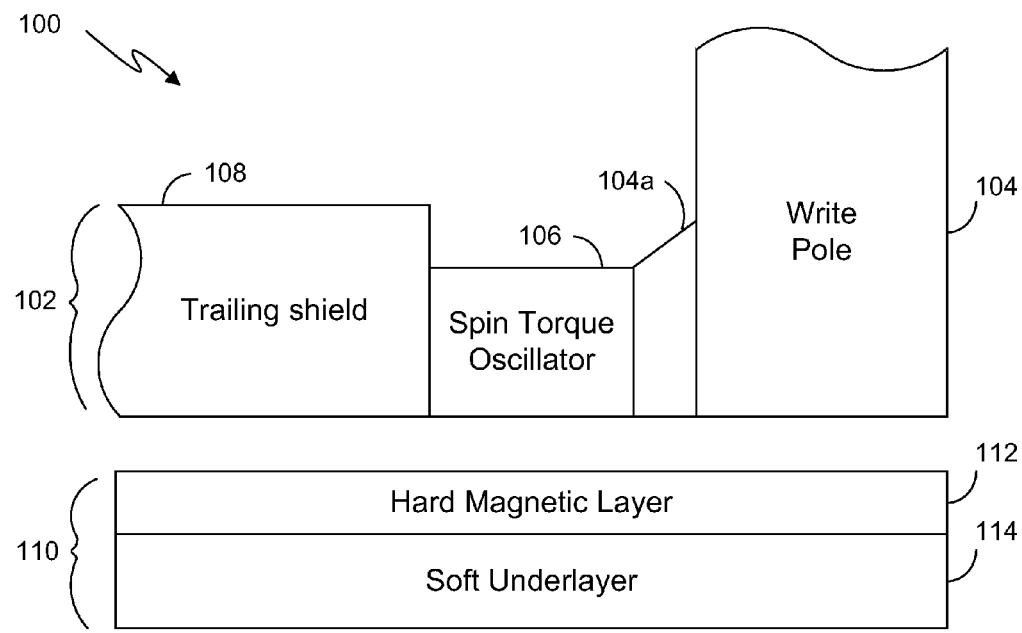
FIG. 1 is a side view of a microwave assisted magnetic recording system including a magnetic transducer having a pole pedestal, a spin torque oscillator and trailing shield positioned above a magnetic media in accordance with one embodiment of the invention.

Referring now to the drawings, embodiments of magnetic transducers having write pole pedestals and processes for forming the write pole pedestals are illustrated. The write pole pedestals are protrusions of the write poles for the magnetic transducers. The magnetic transducers with write pole pedestals can be used in microwave assisted magnetic recording (MAMR) or other suitable systems. In several embodiments, the write pole pedestals have a trapezoidal shape and are positioned between a trailing edge of the write pole and an energy transducer such as a spin torque oscillator. The write pole pedestals can enhance the on track field produced by the write pole while reducing the off track field, thereby preventing or reducing adjacent track interference. As a result, the recording media can have more closely spaced tracks than conventional systems, and thus greater storage capability. Processes for forming the write pole pedestals can involve relatively minor modifications to processes for forming magnetic transducers for microwave assisted magnetic recording. For example, in several embodiments, the processes can be modified to extend the reactive ion etching time of the process step for shaping the energy transducer, thereby shaping both the energy transducer and the write pole.

FIG. 1 is a side view of a microwave assisted magnetic recording (MAMR) system 100 including a magnetic transducer 102 having a write pole 104 with a pole pedestal 104a, a spin torque oscillator 106, and a trailing shield 108 positioned above a magnetic recording media 110 in accordance with one embodiment of the invention. The MAMR system can be used to magnetically read and write information on the magnetic media 110 using high frequency microwave signals.

The recording media 110 includes one or more top layers 112 (e.g., hard magnetic layer) formed of one or more hard magnetic materials, and one or more bottom layers 114 (e.g., soft under layer) formed of one or more soft magnetic materials. In operation, the write pole 104 and spin torque oscillator 106 can generate and direct a high-frequency magnetic field to a microscopic region of the recording media 110 to write magnetic information to, or to read information from, the media 110.

Figure 2:
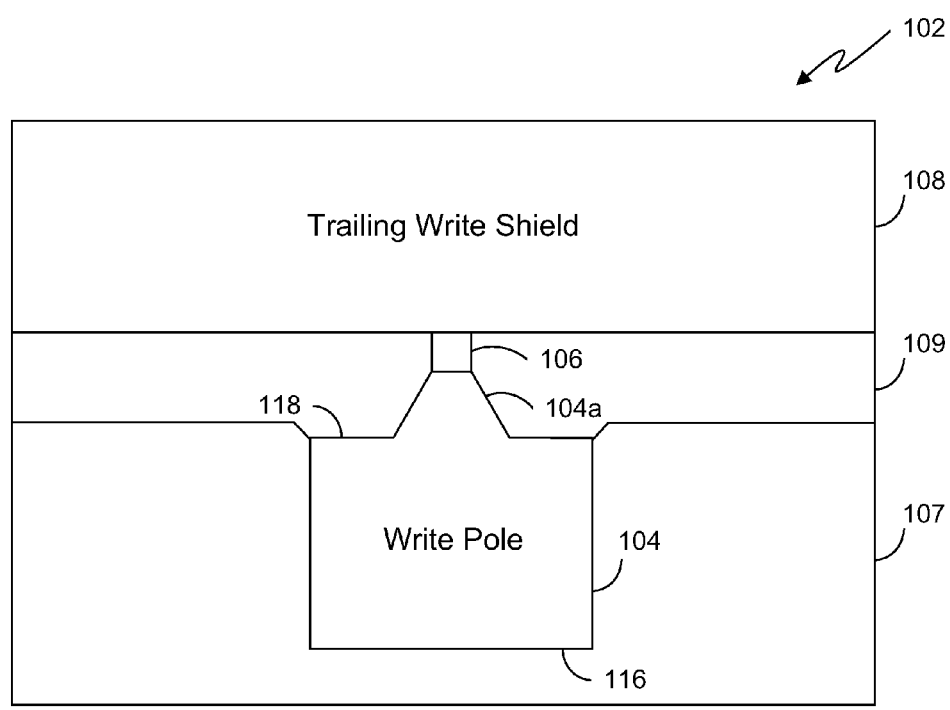
FIG. 2 is a view from the air bearing surface (ABS) of the magnetic transducer of FIG. 1 illustrating the shapes of the pole pedestal, the spin torque oscillator and the trailing shield as viewed from the ABS in accordance with one embodiment of the invention.

FIG. 2 is a view from the air bearing surface (ABS) of the magnetic transducer 102 of FIG. 1 illustrating the pole pedestal shape 104a of the write pole 104, the spin torque oscillator (STO) 106 and the trailing shield 108 as viewed from the ABS in accordance with one embodiment of the invention. The write pole 104 has a substantially rectangular shape which includes a leading edge 116 and a trailing edge 118. The pole pedestal 104a forms an isosceles trapezoid 104a with a long base (e.g., leading parallel side of the trapezoid) positioned along the trailing edge 118 and a short base (e.g., trailing parallel side of the trapezoid) in contact with the spin torque oscillator 106. The magnetic transducer 102 also includes a first encapsulant layer 107 positioned along sides of the write pole 104 and a second encapsulant layer 109 positioned between the trailing write shield 108 and the write pole 104.

In several embodiments, the pole pedestal shape of the write pole 104 can enable concentration of the write pole flux under the STO thus producing a better write process for higher coercivity finer grain media. In addition, the pole pedestal shape of the write pole can provide a reduction in the off track pole field thereby minimizing adjacent track interference (ATI). In some embodiments, the STO can be replaced by another energy transducer such as a near field optical transducer or a waveguide.

In several embodiments, the isosceles trapezoid shaped pole pedestal 104a can have a base angle of about 40 to about 80 degrees, where the base angle is measured relative to the long base (e.g., leading parallel side) of the isosceles trapezoid which has a length greater than that of the short base (e.g., trailing parallel side) of the isosceles trapezoid. In one such embodiment, the base angle is about 60 degrees.

Figure 3D:
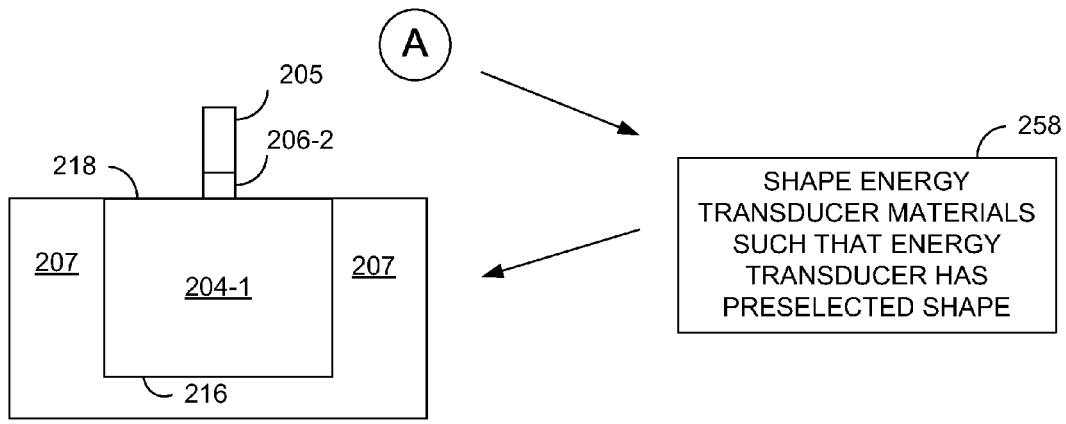

FIGS. 3a to 3g illustrate a sequence of side views of a magnetic transducer workpiece and corresponding processing actions illustrating a process 250 for forming the magnetic transducer including a pole pedestal in accordance with one embodiment of the invention. In particular embodiments, the process 250 can be used to form the magnetic transducer of FIGS. 1 and 2. As illustrated in FIG. 3a, the process first deposits and shapes (252) materials for a write pole and an encapsulant 207. The process can first deposit ferromagnetic material 204-1 and shape it using masked ion milling to form the write pole. The shaped write pole can then be encapsulated by sputter depositing the encapsulant 207 consisting of a ceramic material such as aluminum oxide or another suitable material. In several embodiments, the pole 204-1 has a substantially rectangular shape. As illustrated in FIG. 3b, the process then planarizes (254) the encapsulant 207 and the pole material 204-1 to form the write pole 204-1 which has a leading edge 216 and a trailing edge 218.

As illustrated in FIG. 3c, the process deposits (256) one or more materials 206-1 on the planarized pole material 204-1 to form an energy transducer. In several embodiments, the energy transducer can be a spin torque oscillator. As illustrated in FIG. 3d, the process then shapes (258) the energy transducer materials 206-1 such that the energy transducer has a preselected shape 206-2. In several embodiments, the energy transducer materials 206-1 are shaped by depositing a mask 205 on preselected portions of the energy transducer materials and then removing portions of the energy transducer materials not protected by the mask. In one embodiment, removing the portions of the energy transducer materials not protected by the mask includes performing ion milling on the portions of the energy transducer materials not protected by the mask.

Figure 3E:
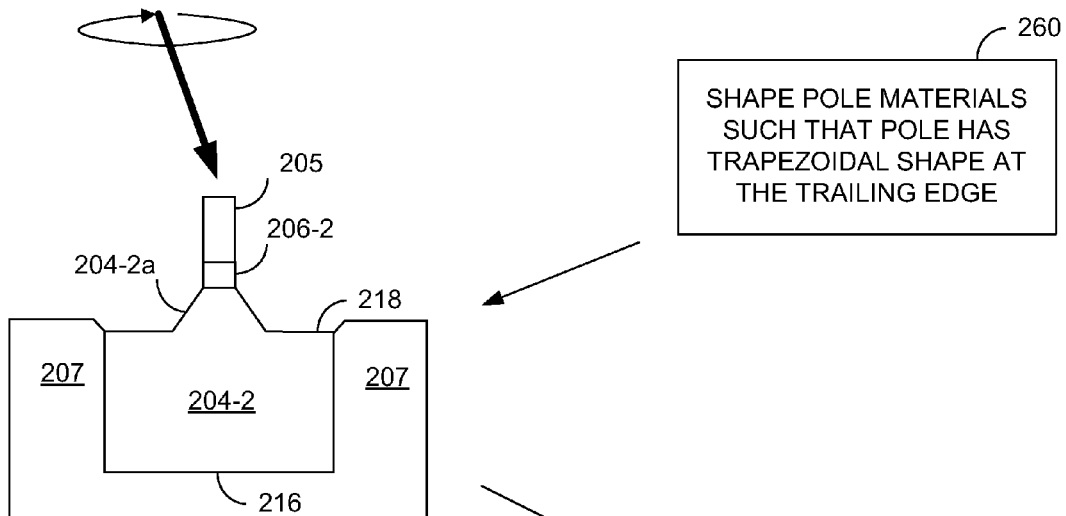

As illustrated in FIG. 3e, the process then shapes (260) the pole materials 204-1 such that the resulting write pole 204-2 has a trapezoidal shape 204-2a at the trailing edge 218 of the write pole 204-2. In several embodiments, the process shapes the pole materials by removing portions of the pole materials at a preselected angle. In one such embodiment, the removing portions of the pole materials at the preselected angle includes performing an etching process on the portions of the pole material at the preselected angle. The etching process can be an ion milling process and/or a reactive ion etching process. In several embodiments, the removing portions of the pole materials at the preselected angle includes rotating the pole material during the etching process, particularly during an ion milling type process. In such case, the workpiece including the write pole 204-2, the energy transducer 206-2, and mask 205 can be rotated while incident ions etch the energy transducer 206-2 and the write pole 204-2 at a preselected angle. In several embodiments, the preselected angle is determined based on a preferred angle of the trapezoid side walls of the pole pedestal 204-2a. In several embodiments, the main portion of the pole 204-2 continues to have a substantially rectangular shape.

As illustrated in FIG. 3f, the process then removes (262) the mask 205 and deposits a second encapsulant 209 (e.g., a ceramic gap layer) on the workpiece. As illustrated in FIG. 3g, the process then planarizes (264) the second encapsulant 209. As illustrated in FIG. 3h, the process then deposits (266) and shapes the trailing write shield 208.

In the embodiments illustrated in FIG. 2 and FIG. 3, the write pole and the write pole pedestal have particular preselected shapes. In other embodiments, the write pole and the write pole pedestal can have other preselected shapes.

In one embodiment, the process can perform the sequence of actions in a different order. In another embodiment, the process can skip one or more of the actions. In other embodiments, one or more of the actions are performed simultaneously. In some embodiments, additional actions can be performed.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A magnetic transducer for microwave assisted magnetic recording, the magnetic transducer comprising:
   a pole comprising a leading edge and a trailing edge;
   a trailing shield positioned closer to the pole trailing edge than the pole leading edge; and
   an energy transducer positioned between the pole trailing edge and the trailing shield,
   wherein a shape of the pole at the trailing edge comprises a trapezoid, wherein a trailing parallel side of the trapezoid is smaller than a leading parallel side of the trapezoid.

2. The magnetic transducer of claim 1, wherein the leading parallel side of the trapezoid is about collinear with the pole trailing edge.

3. The magnetic transducer of claim 1, wherein a shape of the pole at the trailing edge comprises an isosceles trapezoid.

4. The magnetic transducer of claim 3, wherein the energy transducer is closer to the trailing parallel side than the leading parallel side.

5. The magnetic transducer of claim 4, wherein the energy transducer abuts the trailing parallel side.

6. The magnetic transducer of claim 1, wherein a shape of the pole at the trailing edge comprises an isosceles trapezoid having a base angle of about 40 to about 80 degrees, wherein the base angle is relative to the leading parallel side of the trapezoid.

7. The magnetic transducer of claim 1, wherein a shape of the pole air bearing surface at the trailing edge comprises an isosceles trapezoid having a base angle of about 60 degrees, wherein the base angle is relative to the leading parallel side of the trapezoid.

8. The magnetic transducer of claim 1, wherein the energy transducer comprises a spin torque oscillator.

9. The magnetic transducer of claim 1, wherein the energy transducer comprises a component selected from the group consisting of a near field optical transducer and a waveguide.

10. A method for fabricating a magnetic transducer for microwave assisted magnetic recording, the method comprising:
- depositing a ferromagnetic material for a pole;
- planarizing the pole material and thereby forming a pole having a leading edge and a trailing edge;
- depositing one or more materials on the planarized pole material to form an energy transducer;
- shaping the energy transducer materials such that the energy transducer comprises a preselected shape; and
- shaping the pole materials such that the pole air bearing surface comprises a trapezoidal shape at the trailing edge.

11. The method of claim 10, wherein the shaping of the energy transducer materials comprises:
- depositing a mask on preselected portions of the energy transducer materials; and
- removing a portion of the energy transducer materials not protected by the mask.

12. The method of claim 11, wherein the removing the portion of the energy transducer materials not protected by the mask comprises ion milling the portion of the energy transducer materials not protected by the mask.

13. The method of claim 10, wherein the shaping the pole materials comprises removing portions of the pole materials at a preselected angle.

14. The method of claim 13:
- wherein the removing portions of the pole materials at the preselected angle comprises performing an etching process on the portions of the pole material at the preselected angle, and
- wherein the etching process is selected from the group consisting of an ion milling process and a reactive ion etching process.

15. The method of claim 14, wherein the removing portions of the pole materials at the preselected angle further comprises rotating the pole material during the etching process.

16. The method of claim 10, wherein the trapezoidal shape comprises an isosceles trapezoid.

17. The method of claim 16:
- wherein the isosceles trapezoid comprises a leading parallel side and a trailing parallel side, wherein the leading parallel side is parallel to the trailing parallel side,
- wherein a length of the leading parallel side is greater than a length of the trailing parallel side, and
- wherein the energy transducer abuts the trailing parallel side.

18. The method of claim 10, wherein a shape of the pole at the trailing edge comprises an isosceles trapezoid having a base angle of about 40 to about 80 degrees, wherein the base angle is relative to a leading parallel side of the isosceles trapezoid having a length greater than a trailing parallel side of the isosceles trapezoid.

19. The method of claim 10, wherein a shape of the pole at the trailing edge comprises an isosceles trapezoid having a base angle of about 60 degrees, wherein the base angle is relative to a leading parallel side of the isosceles trapezoid having a length greater than a trailing parallel side of the isosceles trapezoid.

20. The method of claim 10, wherein the energy transducer comprises a spin torque oscillator.

21. The method of claim 10, wherein the energy transducer comprises a component selected from the group consisting of a near field optical transducer and a waveguide.

22. The method of claim 10, wherein the depositing of the ferromagnetic material for the pole further comprises encapsulating the pole material.

23. The method of claim 10, wherein the preselected shape of the energy transducer at a bottom surface of the energy transducer comprises about a shape selected from the group consisting of a rectangular shape and a triangular shape.

\* \* \* \* \*